(12) United States Patent
Goro et al.

(10) Patent No.: US 12,553,855 B2
(45) Date of Patent: Feb. 17, 2026

(54) GAS SENSOR

(71) Applicant: NGK INSULATORS, LTD., Aichi (JP)

(72) Inventors: Yohei Goro, Nagoya (JP); Yusuke Watanabe, Nagoya (JP); Akihiro Nakajima, Nagoya (JP); Toshihiro Hirakawa, Kasugai (JP)

(73) Assignee: NGK INSULATORS, LTD., Nagoya (JP)

(*) Notice: Subject to any disclaimer, the term of this patent is extended or adjusted under 35 U.S.C. 154(b) by 448 days.

(21) Appl. No.: 18/082,437

(22) Filed: Dec. 15, 2022

(65) Prior Publication Data

US 2023/0194463 A1  Jun. 22, 2023

(30) Foreign Application Priority Data

Dec. 17, 2021 (JP) .................... 2021-204745

(51) Int. Cl.
*G01N 27/409* (2006.01)
*G01N 27/30* (2006.01)
(Continued)

(52) U.S. Cl.
CPC ......... *G01N 27/409* (2013.01); *G01N 27/301* (2013.01); *G01N 27/4067* (2013.01);
(Continued)

(58) Field of Classification Search
CPC ............... G01N 27/409; G01N 27/301; G01N 27/4067; G01N 27/4073; G01N 27/41; G01N 33/0037; G01N 27/4175
See application file for complete search history.

(56) References Cited

U.S. PATENT DOCUMENTS 5,852,228 A    12/1998   Yamashita et al.
6,083,370 A *   7/2000   Kato ............... G01N 27/4065
                                                    204/425
(Continued)

FOREIGN PATENT DOCUMENTS

JP          10227760 A  *  8/1998   ......... G01N 27/4074
JP          3704880 B2     10/2005
(Continued)

OTHER PUBLICATIONS

German Office Action received in corresponding German Application No. 10 2022 133 102.4 dated Jul. 17, 2025.

*Primary Examiner* — Luan V Van
*Assistant Examiner* — Kaylee Tseng
(74) *Attorney, Agent, or Firm* — MATTINGLY & MALUR, PC (57) ABSTRACT

A gas sensor includes an element body, a pump cell, an impedance measurer, and a calculation unit. The pump cell has an inner electrode disposed in a measurement-object gas flow section of the element body, and an outer electrode disposed outside an element body to come into contact with a measurement-object gas, the pump cell being configured to adjust an oxygen concentration in a vicinity of the inner electrode. The impedance measurer performs first measurement to measure a first impedance by applying a voltage having a first frequency to the pump cell, and second measurement to measure a second impedance by applying a voltage having a second frequency higher than the first frequency to the pump cell. The calculation unit calculates the reaction resistance index correlated with the reaction resistance of the pump cell, based on the first and second impedances.

7 Claims, 5 Drawing Sheets

(51) Int. Cl.
*G01N 27/406* (2006.01)
*G01N 27/407* (2006.01)
*G01N 27/41* (2006.01)
*G01N 33/00* (2006.01)

(52) U.S. Cl.
CPC ......... *G01N 27/4073* (2013.01); *G01N 27/41* (2013.01); *G01N 33/0037* (2013.01)

(56) References Cited

U.S. PATENT DOCUMENTS

| | | |
|---|---|---|
| 2011/0147214 A1 | 6/2011 | Fujita et al. |
| 2019/0025244 A1* | 1/2019 | Okamoto ............ G01N 27/4076 |
| 2019/0094177 A1* | 3/2019 | Higuchi ............. G01N 27/4175 |

FOREIGN PATENT DOCUMENTS

| | | | | |
|---|---|---|---|---|
| JP | 2014209128 A | * | 11/2014 | ......... G01N 27/4071 |
| JP | 2020-165815 A | | 10/2020 | |
| WO | WO-2011048002 A1 | * | 4/2011 | ......... F02D 41/1477 |

* cited by examiner

GAS SENSOR

The present application claims priority from Japanese Patent Application No. 2021-204745, filed on Dec. 17, 2021, the entire contents of which are incorporated herein by reference.

BACKGROUND OF THE INVENTION

1. Field of the Invention

The present invention relates to a gas sensor.

2. Description of the Related Art

Hitherto, a gas sensor that detects the concentration of a specific gas, such as NOx, in a measurement-object gas, such as the exhaust gas of an automobile, is known. For example, the gas sensor of PTL 1 includes an element body having an oxygen-ion-conductive solid electrolyte layer, and a pump cell provided in the element body. The pump cell is configured to include an inner electrode disposed inside the element body, an outer electrode disposed outside the element body, and a solid electrolyte layer between these electrodes. It is known that an impedance of the element is measured in a gas sensor. For example, the gas sensor described in PTL 2 calculates an internal resistance (element impedance) of a solid electrolyte layer from the amount of change in voltage and the amount of change in current when a voltage applied to the sensor is temporarily changed in a positive direction and a negative direction.

CITATION LIST

Patent Literature

PTL 1: JP 2020-165815 A
PTL 2: JP 3704880 B

SUMMARY OF THE INVENTION

Meanwhile, in some cases, a reaction resistance of the pump cell is desired to be measured to recognize the state of deterioration (particularly, deterioration of an electrode included in the pump cell) of the pump cell. However, for example, in PTL 2, measurement of a resistance of a solid electrolyte layer is described, whereas measurement of a reaction resistance of the pump cell is not described.

The present invention has been devised to solve such a problem, and it is a main object to measure the deterioration state of the pump cell.

The present invention employs the following device to achieve the above-described main object.

A gas sensor of the present invention is a gas sensor that detects a specific gas concentration in a measurement-object gas, the gas sensor including: an element body which includes an oxygen-ion-conductive solid electrolyte layer, and is internally provided with a measurement-object gas flow section that introduces a measurement-object gas and flows the measurement-object gas; a pump cell having an inner electrode disposed in the measurement-object gas flow section, and an outer electrode disposed outside the element body to come into contact with the measurement-object gas, the pump cell being configured to adjust an oxygen concentration in a vicinity of the inner electrode; an impedance measurer that performs first measurement to measure a first impedance by applying a voltage having a first frequency to the pump cell and second measurement to measure a second impedance by applying a voltage having a second frequency higher than the first frequency to the pump cell; and a calculation unit that calculates a reaction resistance index correlated with a reaction resistance of the pump cell based on the first impedance and the second impedance.

In this gas sensor, the impedance controller performs first measurement to measure a first impedance by applying a voltage having a first frequency to the pump cell and second measurement to measure a second impedance by applying a voltage having a second frequency higher than the first frequency to the pump cell. The calculation unit then calculates a reaction resistance index correlated with the reaction resistance of the pump cell based on the first impedance and the second impedance. Here, the first, second impedances measured by the impedance measurement include a resistance different from the reaction resistance, specifically, the resistance of a path of current passed by an applied voltage. However, in the first impedance measured by applying a voltage having a low frequency, a reaction resistance of the pump cell is more likely to occur than in the second impedance measured by applying a voltage having a high frequency. For this reason, a reaction resistance index correlated with the reaction resistance of the pump cell can be calculated based on the first impedance and the second impedance. When the pump cell deteriorates and the reaction resistance changes, the reaction resistance index also changes, thus the reaction resistance index represents a deterioration state of the pump cell. Therefore, the gas sensor can measure a deterioration state of the pump cell. Here, when a voltage is applied to the pump cell in the first measurement and the second measurement, the voltage is applied across the inner electrode and the outer electrode included in the pump cell. The reaction resistance of the pump cell is, more specifically, the reaction resistance of the inner electrode and the outer electrode of the pump cell. The deterioration state of the pump cell is, more specifically, the deterioration state of the inner electrode and the outer electrode included in the pump cell.

In this case, the reaction resistance index may be a value related to the difference between the first impedance and the second impedance. For example, the reaction resistance index may be the difference or the ratio between the first impedance and the second impedance.

The gas sensor of the present invention may include a controller that executes a normal time pump control process of controlling the pump cell by applying a control voltage to the pump cell, and during the execution of the first measurement and the second measurement, the controller may reduce the control voltage to a level lower than in the normal time pump control process. This reduces the effect of the control voltage applied to the pump cell on the first measurement and the second measurement, thus the deterioration state of the pump cell can be measured with higher accuracy.

In the gas sensor of the present invention, the first frequency may be lower than or equal to 500 Hz, and the second frequency may be higher than or equal to 1000 Hz. By setting the first frequency to be lower than or equal to 500 Hz, the reaction resistance of the pump cell is more likely to occur in the first impedance. In addition, by setting the second frequency to be higher than or equal to 1000 Hz, the reaction resistance of the pump cell is more unlikely to occur in the second impedance. Therefore, the deterioration state of the pump cell can be measured with higher accuracy using such first frequency and second frequency.

In the gas sensor of the present invention, the calculation unit may calculate a deterioration rate of the pump cell by normalizing the calculated reaction resistance index relative to an initial value of the reaction resistance index. Thus, the degree of progress of deterioration of the pump cell from the initial state can be measured as a deterioration rate.

The gas sensor of the present invention may include a reference electrode disposed inside the element body to come into contact with a reference gas which serves as a reference for detecting the specific gas concentration in the measurement-object gas; and a controller that adjusts an oxygen concentration around the inner electrode by performing feedback control on a control voltage applied across the outer electrode and the inner electrode so that a voltage across the reference electrode and the inner electrode reaches a target value. The controller may correct a control parameter for the feedback control based on the reaction resistance index. Meanwhile, when the pump cell deteriorates and the reaction resistance changes, the pumping capability of the pump cell also changes. Since the gas sensor corrects a control parameter according to the reaction resistance of the pump cell, the pump cell can be controlled appropriately according to the deterioration state of the pump cell.

In the gas sensor of the present invention, the inner electrode is a measurement electrode provided in a measurement chamber of the measurement-object gas flow section, the pump cell may be a measurement pump cell that pumps out oxygen originating from the specific gas from a vicinity of the measurement electrode, and may include: a reference electrode disposed inside the element body to come into contact with a reference gas which serves as a reference for detecting a specific gas concentration in the measurement-object gas; a controller that performs a measurement pump control process of performing feedback control on a control voltage applied across the outer electrode and the measurement electrode so that a voltage across the reference electrode and the measurement electrode reaches a target value; and a specific gas concentration detector that detects the specific gas concentration in the measurement-object gas based on a measurement pump current which flows through the measurement pump cell by the measurement pump control process. The specific gas concentration detector may correct the specific gas concentration based on the reaction resistance index. When the measurement pump cell (particularly, the measurement electrode and the outer electrode) deteriorates and the reaction resistance changes, the pumping capability of the measurement pump cell changes. Thus, even when the NOx concentration in the measurement-object gas is the same before and after the change in the reaction resistance, the measurement pump current may change. In contrast, with this gas sensor, the specific gas concentration is corrected according to the reaction resistance of the measurement pump cell, thus it is possible to prevent reduction in the accuracy of detection of the specific gas concentration due to deterioration of the measurement pump cell.

The gas sensor of the present invention may include a heater that heats the element body; and a heater controller that performs a heater control process of causing the heater to generate heat by energizing the heater so that the temperature of the heater reaches a target temperature. The heater controller may correct the target temperature based on the reaction resistance index. The higher the temperature of the heater, the reaction resistance of the pump cell tends to decrease. Thus, the change in the reaction resistance due to deterioration of the pump cell can be adjusted by correcting the target temperature of the heater based on the reaction resistance index, thus adverse effects due to deterioration of the pump cell can be reduced.

DETAILED DESCRIPTION OF THE INVENTION

Figure 1:
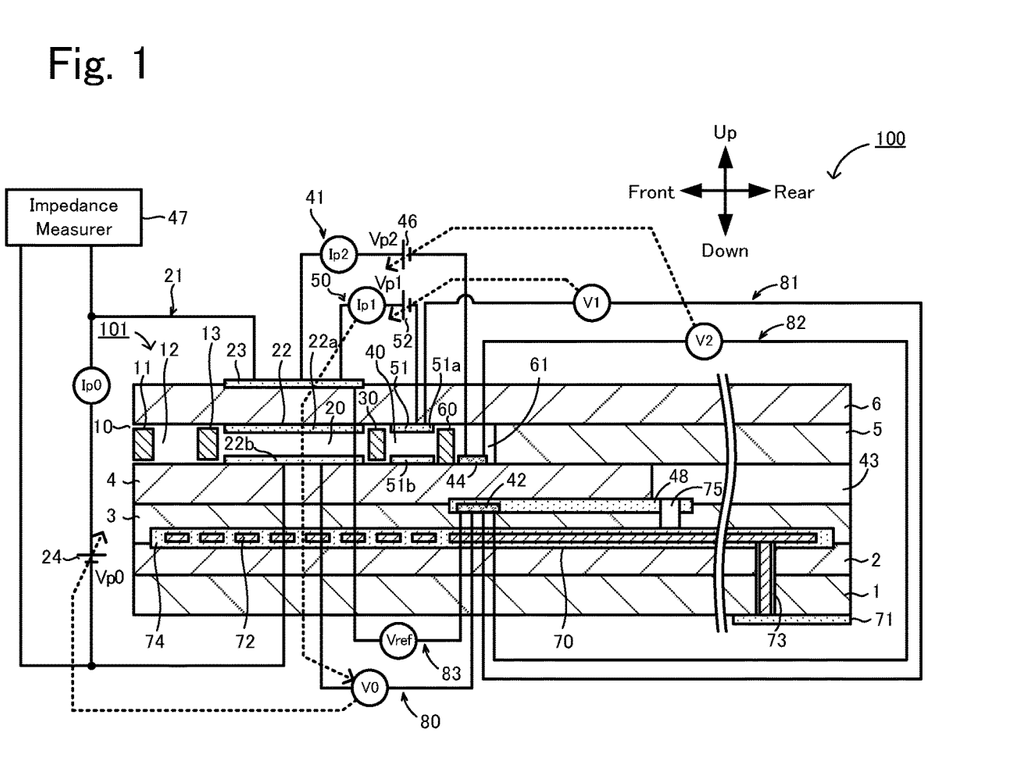
FIG. 1 is a schematic cross-sectional view of a gas sensor 100.
Figure 2:
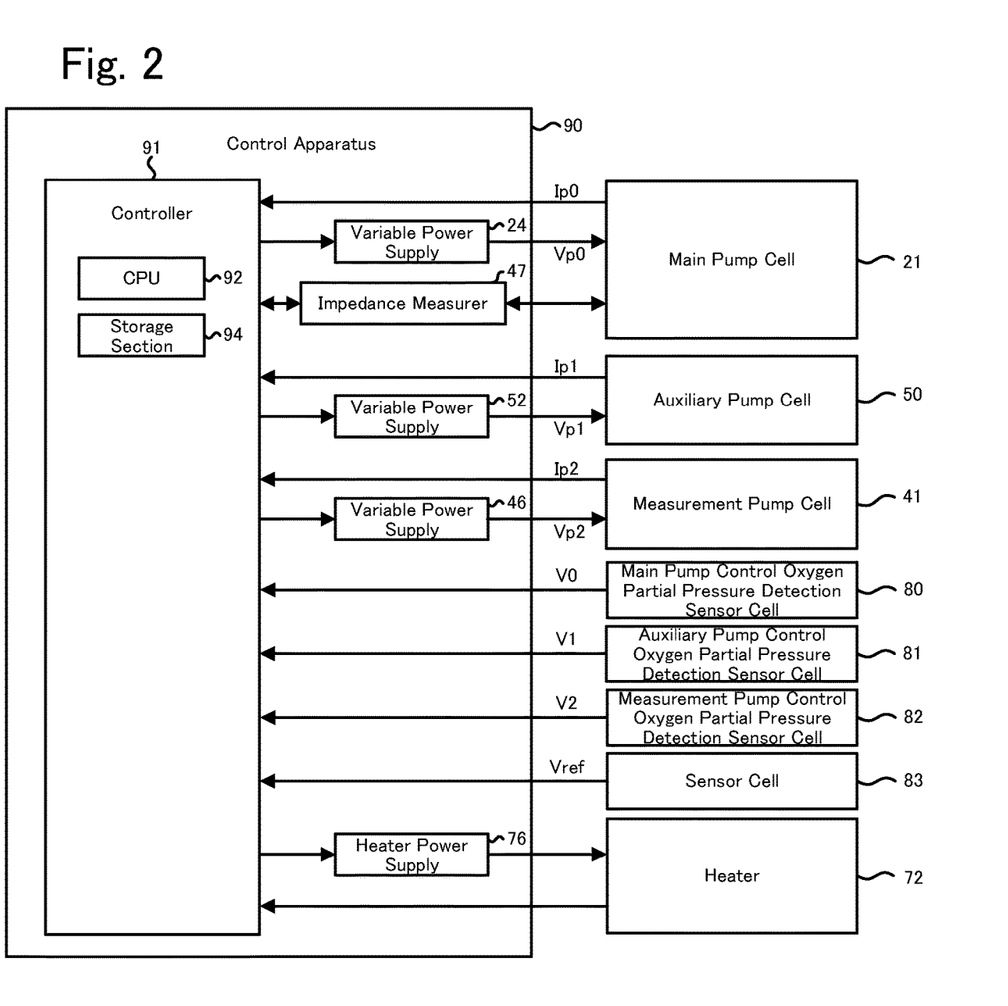
FIG. 2 is a block diagram showing an electrical connection relationship between a control apparatus 90, and cells and a heater 72.

Next, an embodiment of the present invention will be described using the drawings. FIG. 1 is a schematic cross-sectional view schematically showing an example of a configuration of a gas sensor 100 which is an embodiment of the present invention. FIG. 2 is a block diagram showing electrical connection relationship between a control apparatus 90, and cells as well as a heater 72. The gas sensor 100 is, for example, installed in a pipe, such as an exhaust gas pipe of an internal combustion engine, such as a diesel engine. The gas sensor 100 uses the exhaust gas from the internal combustion engine as a measurement-object gas, and detects the specific gas concentration, such as NOx in the measurement-object gas. The gas sensor 100 includes a long rectangular parallelepiped sensor element 101, cells 21, 41, 50, 80 to 83 each including a part of the sensor element 101, a heater portion 70 provided inside the sensor element 101, and the control apparatus 90 that controls the overall gas sensor 100.

The sensor element 101 is an element having a layered body in which six layers, that is, a first substrate layer 1, a second substrate layer 2, a third substrate layer 3, a first solid electrolyte layer 4, a spacer layer 5, and a second solid electrolyte layer 6, each made up of an oxygen-ion-conductive solid electrolyte layer made of zirconia ($ZrO_2$) or the like, are laminated in this order from a lower side in the drawing. The solid electrolyte forming these six layers is a dense, airtight one. The sensor element 101 is manufactured by, for example, applying predetermined processing, printing of a circuit pattern, and the like on a ceramic green sheet corresponding to each layer, then laminating those sheets, and further firing the sheets to be integrated.

At a tip end portion side of the sensor element 101 (left end portion side in FIG. 1), a gas inlet port 10, a first diffusion controlled portion 11, a buffer space 12, a second diffusion controlled portion 13, a first internal cavity 20, a third diffusion controlled portion 30, a second internal cavity 40, a fourth diffusion controlled portion 60, and a third internal cavity 61 are formed adjacent to each other so as to communicate with each other in this order between the under surface of the second solid electrolyte layer 6 and the top surface of the first solid electrolyte layer 4.

The gas inlet port 10, the buffer space 12, the first internal cavity 20, the second internal cavity 40, and the third internal cavity 61 are spaces of which top parts, bottom parts, and side parts, provided by hollowing the spacer layer 5, are respectively defined by the under surface of the second solid electrolyte layer 6, the top surface of the first solid electrolyte layer 4, and the side surface of the spacer layer 5 inside the sensor element 101.

Each of the first diffusion controlled portion 11, the second diffusion controlled portion 13, and the third diffusion controlled portion 30 is provided as two laterally long slits (openings of which the longitudinal direction is a direction perpendicular to the drawing). The fourth diffusion controlled portion 60 is provided as a single laterally long slit (an opening of which the longitudinal direction is a direction perpendicular to the drawing) formed as a clearance from the under surface of the second solid electrolyte layer 6. A part from the gas inlet port 10 to the third internal cavity 61 is also referred to as measurement-object gas flow portion.

At a location farther from the tip end side than the measurement-object gas flow portion, a reference gas inlet space 43 is provided between the top surface of the third substrate layer 3 and the under surface of the spacer layer 5 at a location at which the side part is defined by the side surface of the first solid electrolyte layer 4. For example, the atmosphere is introduced into the reference gas inlet space 43 as a reference gas at the time of measuring a NOx concentration.

An atmosphere inlet layer 48 is a layer made of porous ceramics. The reference gas is introduced into the atmosphere inlet layer 48 through the reference gas inlet space 43. The atmosphere inlet layer 48 is formed so as to coat the reference electrode 42.

The reference electrode 42 is an electrode formed in such a manner in which the reference electrode 42 is sandwiched by the top surface of the third substrate layer 3 and the first solid electrolyte layer 4. As described above, the atmosphere inlet layer 48 that communicates with the reference gas inlet space 43 is provided around the reference electrode 42. As will be described later, it is possible to measure an oxygen concentration (oxygen partial pressure) in the first internal cavity 20, an oxygen concentration (oxygen partial pressure) in the second internal cavity 40, and an oxygen concentration (oxygen partial pressure) in the third internal cavity 61 by using the reference electrode 42. The reference electrode 42 is formed as a porous cermet electrode (for example, a cermet electrode of Pt and $ZrO_2$).

In the measurement-object gas flow portion, the gas inlet port 10 is a portion that is open to an external space, and a measurement-object gas is taken into the sensor element 101 from the external space through the gas inlet port 10. The first diffusion controlled portion 11 is a portion that applies predetermined diffusion resistance to a measurement-object gas taken in through the gas inlet port 10. The buffer space 12 is a space provided to guide the measurement-object gas introduced from the first diffusion controlled portion 11 to the second diffusion controlled portion 13. The second diffusion controlled portion 13 is a portion that applies predetermined diffusion resistance to the measurement-object gas introduced from the buffer space 12 into the first internal cavity 20. When the measurement-object gas is introduced from the outside of the sensor element 101 into the first internal cavity 20, the measurement-object gas rapidly taken into the sensor element 101 through the gas inlet port 10 due to pressure fluctuations of the measurement-object gas in the external space (due to pulsation of exhaust pressure when the measurement-object gas is the exhaust gas of an automobile) is not directly introduced into the first internal cavity 20 but, after pressure fluctuations of the measurement-object gas are canceled out through the first diffusion controlled portion 11, the buffer space 12, and the second diffusion controlled portion 13, the measurement-object gas is introduced into the first internal cavity 20. With this configuration, pressure fluctuations of the measurement-object gas introduced into the first internal cavity 20 are almost ignorable. The first internal cavity 20 is provided as a space used to adjust an oxygen partial pressure in the measurement-object gas introduced through the second diffusion controlled portion 13. The oxygen partial pressure is adjusted by the operation of a main pump cell 21.

The main pump cell 21 is an electrochemical pump cell made up of an inner pump electrode 22 having a ceiling electrode portion 22a provided almost all over the under surface of the second solid electrolyte layer 6, facing the first internal cavity 20, the outer pump electrode 23 provided so as to be exposed to the external space in a region of the top surface of the second solid electrolyte layer 6, corresponding to the ceiling electrode portion 22a, and the second solid electrolyte layer 6 sandwiched by these electrodes.

The inner pump electrode 22 is formed over the upper and lower solid electrolyte layers (the second solid electrolyte layer 6 and the first solid electrolyte layer 4) defining the first internal cavity 20, and the spacer layer 5 providing a side wall. Specifically, the ceiling electrode portion 22a is formed on the under surface of the second solid electrolyte layer 6, providing a ceiling surface of the first internal cavity 20, a bottom electrode portion 22b is formed on the top surface of the first solid electrolyte layer 4, providing a bottom surface, a side electrode portion (not shown) is formed on the side wall surface (inner surface) of the spacer layer 5, making both side wall portions of the first internal cavity 20, so as to connect those ceiling electrode portion 22a and the bottom electrode portion 22b, and the inner pump electrode 22 is disposed with a structure in a tunnel form at a portion where the side electrode portion is disposed.

The inner pump electrode 22 and the outer pump electrode 23 each are formed as a porous cermet electrode (for example, a cermet electrode of Pt and $ZrO_2$, having an Au content of 1 percent). The inner pump electrode 22 that contacts with a measurement-object gas is formed by using a material of which the reduction ability for NOx components in the measurement-object gas is lowered.

By passing a pump current Ip0 in a positive direction or a negative direction between the inner pump electrode 22 and the outer pump electrode 23 by applying a desired voltage Vp0 between the inner pump electrode 22 and the outer pump electrode 23, the main pump cell 21 is capable of pumping out oxygen in the first internal cavity 20 to the external space or pumping oxygen in the external space into the first internal cavity 20.

In order to detect an oxygen concentration (oxygen partial pressure) in an atmosphere in the first internal cavity 20, an electrochemical sensor cell, that is, a main pump control oxygen partial pressure detection sensor cell 80, is made up of the inner pump electrode 22, the second solid electrolyte layer 6, the spacer layer 5, the first solid electrolyte layer 4, the third substrate layer 3, and the reference electrode 42.

An oxygen concentration (oxygen partial pressure) in the first internal cavity 20 is found by measuring an electromotive force (voltage V0) in the main pump control oxygen partial pressure detection sensor cell 80. In addition, the pump current Ip0 is controlled by executing feedback control over the voltage Vp0 of a variable power supply 24 such that the voltage V0 becomes a target value. With this configuration, it is possible to maintain the oxygen concentration in the first internal cavity 20 at a predetermined constant value.

The third diffusion controlled portion 30 is a portion that applies predetermined diffusion resistance to a measurement-object gas of which the oxygen concentration (oxygen partial pressure) is controlled by operation of the main pump cell 21 in the first internal cavity 20 to guide the measurement-object gas to the second internal cavity 40.

The second internal cavity 40 is provided as a space used to further adjust the oxygen partial pressure by using an auxiliary pump cell 50 for the measurement-object gas adjusted in the oxygen concentration (oxygen partial pressure) in the first internal cavity 20 in advance and then introduced through the third diffusion controlled portion 30. With this configuration, it is possible to highly accurately maintain the oxygen concentration in the second internal cavity 40 at a constant value, so it is possible to measure a highly accurate NOx concentration with the gas sensor 100.

The auxiliary pump cell 50 is an auxiliary electrochemical pump cell made up of an auxiliary pump electrode 51 having a ceiling electrode portion 51a provided substantially all over the under surface of the second solid electrolyte layer 6, facing the second internal cavity 40, the outer pump electrode 23 (not limited to the outer pump electrode 23, and an adequate electrode outside the sensor element 101 may be used), and the second solid electrolyte layer 6.

The auxiliary pump electrode 51 is disposed in the second internal cavity 40 with a structure in a similar tunnel form to that of the inner pump electrode 22 provided in the above-described first internal cavity 20. In other words, the auxiliary pump electrode 51 has such a structure in a tunnel form that a ceiling electrode portion 51a is formed on the second solid electrolyte layer 6 providing the ceiling surface of the second internal cavity 40, a bottom electrode portion 51b is formed on the first solid electrolyte layer 4 providing the bottom surface of the second internal cavity 40, a side electrode portion (not shown) that couples those ceiling electrode portion 51a and bottom electrode portion 51b is formed on each of both wall surfaces of the spacer layer 5, providing a side wall of the second internal cavity 40. The auxiliary pump electrode 51, as well as the inner pump electrode 22, is formed by using a material of which the reduction ability for NOx components in the measurement-object gas is lowered.

By applying a desired voltage Vp1 between the auxiliary pump electrode 51 and the outer pump electrode 23, the auxiliary pump cell 50 is capable of pumping out oxygen in an atmosphere in the second internal cavity 40 to the external space or pumping oxygen from the external space into the second internal cavity 40.

In order to control an oxygen partial pressure in an atmosphere in the second internal cavity 40, an electrochemical sensor cell, that is, an auxiliary pump control oxygen partial pressure detection sensor cell 81, is made up of the auxiliary pump electrode 51, the reference electrode 42, the second solid electrolyte layer 6, the spacer layer 5, the first solid electrolyte layer 4, and the third substrate layer 3.

The auxiliary pump cell 50 performs pumping with a variable power supply 52 of which the voltage is controlled in accordance with an electromotive force (voltage V1) detected by the auxiliary pump control oxygen partial pressure detection sensor cell 81. With this configuration, the oxygen partial pressure in an atmosphere in the second internal cavity 40 is controlled to a low partial pressure that substantially does not influence measurement of NOx.

Together with this, its pump current Ip1 is used to control the electromotive force of the main pump control oxygen partial pressure detection sensor cell 80. Specifically, the pump current Ip1 is input to the main pump control oxygen partial pressure detection sensor cell 80 as a control signal, and the gradient of the oxygen partial pressure in the measurement-object gas to be introduced from the third diffusion controlled portion 30 into the second internal cavity 40 is controlled to be constantly unchanged by controlling the above-described target value of the voltage V0. When used as a NOx sensor, the oxygen concentration in the second internal cavity 40 is maintained at a constant value of about 0.001 ppm by the functions of the main pump cell 21 and auxiliary pump cell 50.

The fourth diffusion controlled portion 60 is a portion that applies predetermined diffusion resistance to measurement-object gas of which the oxygen concentration (oxygen partial pressure) is controlled by operation of the auxiliary pump cell 50 in the second internal cavity 40 to guide the measurement-object gas to the third internal cavity 61. The fourth diffusion controlled portion 60 plays a role in limiting the amount of NOx flowing into the third internal cavity 61.

The third internal cavity 61 is provided as a space used to perform a process related to measurement of a nitrogen oxide (NOx) concentration in a measurement-object gas on the measurement-object gas adjusted in oxygen concentration (oxygen partial pressure) in the second internal cavity 40 in advance and then introduced through the fourth diffusion controlled portion 60. Measurement of a NOx concentration is mainly performed by operation of a measurement pump cell 41 in the third internal cavity 61.

The measurement pump cell 41 measures a NOx concentration in the measurement-object gas in the third internal cavity 61. The measurement pump cell 41 is an electrochemical pump cell made up of a measurement electrode 44 provided on the top surface of the first solid electrolyte layer 4, facing the third internal cavity 61, the outer pump electrode 23, the second solid electrolyte layer 6, the spacer layer 5, and the first solid electrolyte layer 4. The measurement electrode 44 is a porous cermet electrode made of a material of which the reduction ability for NOx components in the measurement-object gas is raised as compared to the inner pump electrode 22. The measurement electrode 44 also functions as a NOx reduction catalyst that reduces NOx present in an atmosphere in the third internal cavity 61.

Specifically, the measurement electrode 44 is an electrode containing at least one of Pt and Rh that is a catalytically active noble metal. The measurement electrode 44 is preferably an electrode formed of a cermet containing at least one of Pt and Rh and an oxygen-ion-conductive oxide (here, $ZrO_2$). Furthermore, the measurement electrode 44 is preferably porous body. In this embodiment, the measurement electrode 44 is a porous cermet electrode composed of Pt, Rh, and $ZrO_2$.

The measurement pump cell 41 is capable of pumping out oxygen produced as a result of decomposition of nitrogen oxides in an atmosphere around the measurement electrode 44 and detecting the amount of oxygen produced as a pump current Ip2.

In order to detect an oxygen partial pressure around the measurement electrode 44, an electrochemical sensor cell, that is, a measurement pump control oxygen partial pressure detection sensor cell 82, is made up of the first solid electrolyte layer 4, the third substrate layer 3, the measurement electrode 44, and the reference electrode 42. A variable power supply 46 is controlled in accordance with an electromotive force (voltage V2) detected by the measurement pump control oxygen partial pressure detection sensor cell 82.

A measurement-object gas guided into the second internal cavity 40 reaches the measurement electrode 44 in the third internal cavity 61 through the fourth diffusion controlled portion 60 in a situation in which the oxygen partial pressure is controlled. Nitrogen oxides in the measurement-object gas around the measurement electrode 44 are reduced ($2NO \rightarrow N_2 + O_2$) to produce oxygen. The produced oxygen is to be pumped by the measurement pump cell 41. At this time, the voltage Vp2 of the variable power supply 46 is controlled such that the voltage V2 detected by the measurement pump control oxygen partial pressure detection sensor cell 82 is constant (target value). The amount of oxygen produced around the measurement electrode 44 is proportional to the concentration of nitrogen oxides in the measurement-object gas, so a nitrogen oxide concentration in the measurement-object gas is calculated by using the pump current Ip2 in the measurement pump cell 41.

An electrochemical sensor cell 83 is made up of the second solid electrolyte layer 6, the spacer layer 5, the first solid electrolyte layer 4, the third substrate layer 3, the outer pump electrode 23, and the reference electrode 42, and it is possible to detect an oxygen partial pressure in a measurement-object gas outside the sensor by using an electromotive force (voltage Vref) obtained by the sensor cell 83.

In the gas sensor 100 having such a configuration, a measurement-object gas of which the oxygen partial pressure is maintained at a constantly unchanged low value (a value that substantially does not influence measurement of NOx) is supplied to the measurement pump cell 41 by operating the main pump cell 21 and the auxiliary pump cell 50. Therefore, it is possible to find a NOx concentration in the measurement-object gas in accordance with a pump current Ip2 that flows as a result of pumping out oxygen, produced by reduction of NOx, by the measurement pump cell 41 substantially in proportion to a NOx concentration in the measurement-object gas.

In addition, the sensor element 101 includes the heater portion 70 that plays a role in temperature adjustment for maintaining the temperature of the sensor element 101 by heating in order to increase the oxygen ion conductivity of the solid electrolyte. The heater portion 70 includes a heater connector electrode 71, a heater 72, a through-hole 73, a heater insulating layer 74, and a pressure release hole 75.

The heater connector electrode 71 is an electrode formed in such a manner as to be in contact with the under surface of the first substrate layer 1. Connection of the heater connector electrode 71 to an external power supply allows electric power to be supplied from the outside to the heater portion 70.

The heater 72 is an electric resistor formed in such a manner as to be sandwiched by the second substrate layer 2 and the third substrate layer 3 from upper and lower sides. The heater 72 is connected to the heater connector electrode 71 via the through-hole 73, and is supplied with electric power from a heater power supply 76 (see FIG. 2) to generate heat to increase and retain the temperature of the solid electrolyte forming the sensor element 101.

The heater 72 is embedded all over the region from the first internal cavity 20 to the third internal cavity 61, and is capable of adjusting the overall sensor element 101 to a temperature at which the solid electrolyte is activated.

The heater insulating layer 74 is an electrically insulating layer formed of an insulating material, such as alumina, on the top and under surfaces of the heater 72. The heater insulating layer 74 is formed for the purpose of obtaining an electrical insulation property between the second substrate layer 2 and the heater 72 and an electrical insulation property between the third substrate layer 3 and the heater 72.

The pressure release hole 75 is a portion provided so as to extend through the third substrate layer 3 and the atmosphere inlet layer 48 and communicate with the reference gas inlet space 43. The pressure release hole 75 is formed for the purpose of easing an increase in internal pressure resulting from an increase in temperature in the heater insulating layer 74.

As shown in FIG. 2, the control apparatus 90 includes the above-mentioned variable power supplies 24,46,52, an impedance measurer 47, the above-mentioned heater power supply 76, and the controller 91.

The impedance measurer 47 is a device that performs impedance measurement by applying a voltage having a predetermined frequency to the main pump cell 21. The impedance measurer 47 includes, for example, a power supply, a voltage measurer, and a current measurer which are not illustrated, and measures an impedance based on the voltage and current measured by the voltage measurer and the current measurer when a voltage is applied from the power supply. The impedance measurer 47 performs impedance measurement by applying a voltage across the inner pump electrode 22 and the outer pump electrode 23 of the main pump cell 21.

The controller 91 is a microprocessor including a CPU 92 and a storage section 94. The storage section 94 is a device that stores, for example, various programs and various data. The controller 91 receives input of the voltage V0 detected by the main pump control oxygen partial pressure detection sensor cell 80, the voltage V1 detected by the auxiliary pump control oxygen partial pressure detection sensor cell 81, the voltage V2 detected by the measurement pump control oxygen partial pressure detection sensor cell 82, the voltage Vref detected by the sensor cell 83, the pump current Ip0 detected by the main pump cell 21, the pump current Ip1 detected by the auxiliary pump cell 50 and the pump current Ip2 detected by the measurement pump cell 41. In addition, the controller 91 controls the voltages Vp0, Vp1, Vp2 output from the variable power supplies 24, 46, 52 by outputting control signals to the variable power supplies 24, 46, 52, thereby controlling the main pump cell 21, the measurement pump cell 41 and the auxiliary pump cell 50. The controller 91 causes the impedance measurer 47 to perform impedance measurement by outputting a control signal to the impedance measurer 47, and receives input of an impedance value as a result of the measurement from the impedance measurer 47. In addition, the controller 91 calculates the later-mentioned reaction resistance index Rr based on the value of the input impedance. The controller 91 outputs a control signal to the heater power supply 76, thereby controlling the electric power supplied to the heater 72 by the heater power supply 76. The storage section 94 also stores the later-described target value V0*, V1*, V2*. The CPU 92 of the controller 91 refers to these target value V0*, V1*, V2*, and controls the cells 21, 41, 50.

The controller 91 executes an auxiliary pump control process of controlling the auxiliary pump cell 50 so that the oxygen concentration in the second internal cavity 40 reaches a target concentration. Specifically, the controller 91 controls the auxiliary pump cell 50 by executing feedback control on the voltage Vp1 of the variable power supply 52 so that the voltage V1 reaches a constant value (referred to as target value V1*). The target value V1* is defined as the value that causes the oxygen concentration in the second internal cavity 40 to reach a predetermined low oxygen concentration that does not substantially affect measurement of NOx.

The controller 91 executes a main pump control process of controlling the main pump cell 21 so that the pump current Ip1 which flows at the time of adjusting the oxygen concentration in the second internal cavity 40 by the auxiliary pump cell 50 through the auxiliary pump control process reaches a target current (referred to as target value Ip1*). Specifically, the controller 91 makes setting (feedback control) of a target value (referred to as target value V0*) of the voltage V0 based on the pump current Ip1 so that the pump electric current Ip1 flowing by the voltage Vp1 reaches a constant target current Ip1*. The controller 91 then executes feedback control on the voltage Vp0 of the variable power supply 24 so that the voltage V0 reaches the target value V0* (in other words, the oxygen concentration in the first internal cavity 20 reaches the target concentration). The gradient of oxygen partial pressure in a measurement-object gas to be introduced from the third diffusion controlled portion 30 into the second internal cavity 40 is made unchanged constantly by the main pump control process. The target value V0* is set to a value which causes the oxygen concentration in the first internal cavity 20 to be higher than 0% and a low oxygen concentration. The pump current Ip0 which flows during the main pump control process varies according to the oxygen concentration in a measurement-object gas (that is, a measurement-object gas in the surroundings of the sensor element 101) flowed into the measurement-object gas flow portion through the gas inlet port 10. Thus, the controller 91 can also detect the oxygen concentration in a measurement-object gas based on the pump current Ip0.

The main pump control process and the auxiliary pump control process described above are also collectively referred as an adjustment pump control process. The first internal cavity 20 and the second internal cavity 40 are also collectively referred as an oxygen concentration adjustment chamber. The main pump cell 21 and the auxiliary pump cell 50 are also collectively referred as an adjustment pump cell. The controller 91 executes the adjustment pump control process, and thereby the adjustment pump cell adjusts the oxygen concentration in the oxygen concentration adjustment chamber.

In addition, the controller 91 performs a measurement pump control process of controlling the measurement pump cell 41 so that the voltage V2 reaches a constant value (target value) (specifically, so that the oxygen concentration in the third internal cavity 61 reaches a predetermined low concentration). Specifically, the controller 91 controls the measurement pump cell 41 by performing feedback control on the voltage Vp2 of the variable power supply 46 so that the voltage V2 reaches the target value V2*. Oxygen is pumped out from the third internal cavity 61 by the measurement pump control process.

Execution of the normal time measurement pump control process causes oxygen to be pumped out from the third internal cavity 61 so that the oxygen produced due to reduction of NOx in a measurement-object gas in the third internal cavity 61 become substantially zero. The controller 91 obtains a pump current Ip2 as a detected value according to the oxygen produced in the third internal cavity 61 from a specific gas (here, NOx), and calculates the NOx concentration in a measurement-object gas based on the pump current Ip2.

The storage section 94 stores a relational expression (for example, an expression of a linear function or a quadratic function) or a map as a correspondence relationship between the pump current Ip2 and the NOx concentration. Such a relational expression or a map may be predetermined by an experiment.

Figure 3:
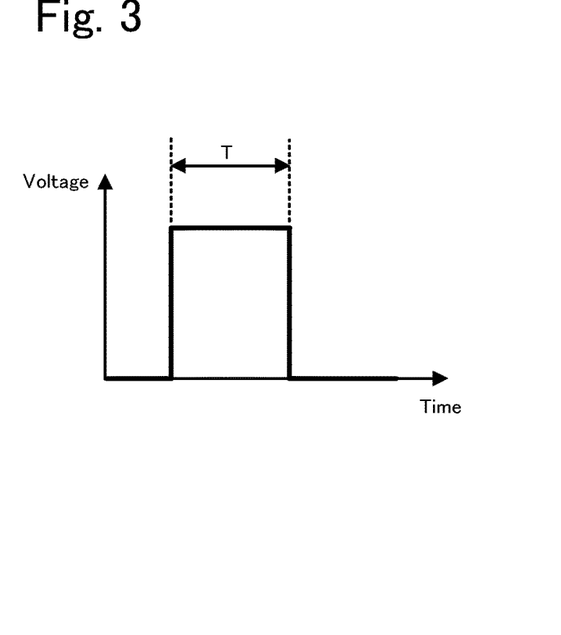
FIG. 3 is a graph showing an example of a pulse voltage applied to a main pump cell 21.
Figure 4:
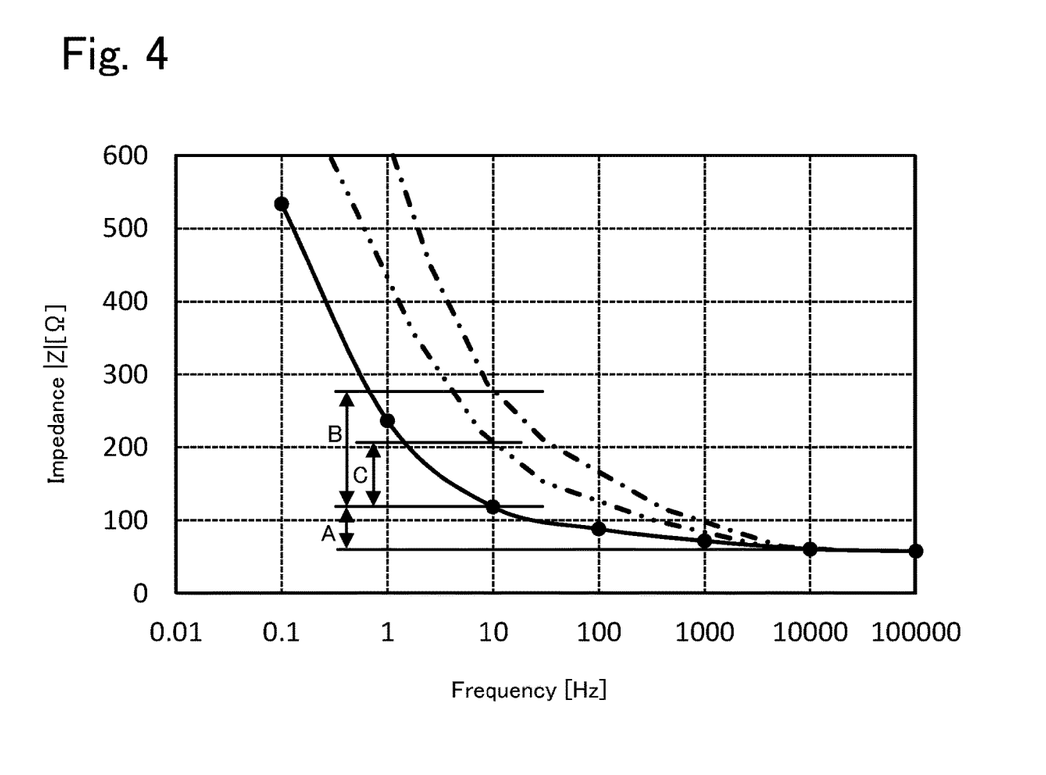
FIG. 4 is a graph showing a relationship between the frequency of a pulse voltage applied to the main pump cell 21 and an impedance |Z|.

The inventors studied the relationship between the frequency of an applied voltage and the impedance measured based on the applied voltage in the main pump cell 21 in the following manner. Specifically, first, the sensor element 101 was heated by the heater 72 up to an operating temperature, specifically a temperature (here, 850° C.) at which solid electrolyte is activated. In this state, the pulse voltage shown in FIG. 3 was applied across the inner pump electrode 22 and the outer pump electrode 23 in an air atmosphere, and the amount of change $\Delta V$ then in the voltage across the inner pump electrode 22 and the outer pump electrode, and the amount of change $\Delta I$ then in the current which flows through the pump cell 21 were measured. Then an impedance $|Z|$ [$\Omega$] was calculated ($|Z|=\Delta V/\Delta I$) by dividing the amount of change $\Delta V$ in the voltage by the amount of change $\Delta I$ in the current. This impedance calculation was repeated several times with different frequencies of the pulse voltage applied. Specifically, an impedance was calculated for each of the cases where the frequency of the pulse voltage is 100000 Hz, 10000 Hz, 1000 Hz, 100 Hz, 10 Hz, 1 Hz, or 0.1 Hz. The relationship between the frequency of the pulse voltage and the impedance $|Z|$ is shown in FIG. 4. In FIG. 4, results of measurement at seven points are shown by black dots, and an approximate curve based on the results of measurement is shown by a solid line. In FIG. 4, the horizontal axis is shown as a logarithmic axis. The frequency of a pulse voltage was calculated as $1/(2 \times T)$ [Hz], where T [sec] is the pulse width of a pulse voltage applied. In this embodiment, the pulse voltage applied is assumed to be a rectangular wave as shown in FIG. 3.

As seen from FIG. 4, it was verified that the measured impedance $|Z|$ tends to increase as the frequency of the applied voltage decreases. This is probably due to the following reasons. First, the resistance (here, the resistance of a solid electrolyte layer which is a current path between the inner pump electrode 22 and the outer pump electrode 23 across which the voltage is applied, in other words, the resistance of the layers 4 to 6) of a path of current passed by the applied voltage is probably considered to occur as a component of the impedance $|Z|$ regardless of the frequency. In contrast, the inner pump electrode 22 and the outer pump electrode 23 are represented, for example, as a circuit in which a reaction resistance and an electrostatic capacitance are connected in parallel, thus the reaction resistance is more likely to occur as a component of the impedance $|Z|$ as the frequency of the applied voltage decreases. Because of this, as mentioned above, the measured impedance $|Z|$ is considered to be increased as the frequency decreases.

Thus, the inventors devised a way to reduce the effect of the above-mentioned resistance (in this case, the resistance of the layers 4 to 6) of a current path and to calculate a value with higher correlation with the reaction resistance by using the values of two impedances measured by applying voltages having different frequencies each other rather than an impedance measured by applying a voltage having a single frequency. Specifically, first, first measurement to measure a first impedance R1 by applying a voltage having a first frequency across the inner pump electrode 22 and the outer pump electrode 23, and second measurement to measure a second impedance R2 by applying a voltage having a second frequency higher than the first frequency are performed. In this manner, in the first impedance R1, the reaction resistance of the inner pump electrode 22 and the outer pump electrode 23 in addition to the resistance of a current path are likely to occur, whereas in the second impedance R2, the reaction resistance of the inner pump electrode 22 and the outer pump electrode 23 is unlikely to occur although the resistance of a current path occurs. Thus, the greater the reaction resistance of the inner pump electrode 22 and the outer pump electrode 23, the larger the difference between the first impedance R1 and the second impedance R2. Therefore, the reaction resistance index Rr correlated with the reaction resistance of the main pump cell 21 (particularly, the inner pump electrode 22 and the outer pump electrode 23) can be calculated based on the first impedance R1 and the second impedance R2. The reaction resistance index Rr may be a value that increases or decreases for a larger difference between R1 and R2. For example, the reaction resistance index Rr may be the difference between R1 and R2 (Rr=R1−R2, or Rr=R2−R1), or may be a ratio (Rr=R1/R2, or Rr=R2/R1). In this embodiment, the reaction resistance index Rr is the difference between R1 and R2 (Rr=R1−R2).

In addition, the reaction resistance of the main pump cell 21 changes also due to the deterioration state of the main pump cell 21 (particularly, the inner pump electrode 22 and the outer pump electrode 23). Specifically, when at least one of the inner pump electrode 22 and the outer pump electrode 23 deteriorates through use, the reaction resistance of the main pump cell 21 increases. As a result, the relationship between the frequency of pulse voltage and the impedance |Z| changes from the curve shown by the solid line of FIG. 4 to the curve shown by a dashed-dotted line, for example. Specifically, the value of impedance |Z|, particularly in a region with a low frequency increases as compared to before the deterioration. Therefore, the reaction resistance index Rr also changes as compared to before the deterioration of the main pump cell 21, and for example, in the case of this embodiment, the value of the reaction resistance index Rr increases as at least one of the inner pump electrode 22 and the outer pump electrode 23 deteriorates. When the main pump cell 21 deteriorates and the reaction resistance changes, the reaction resistance index Rr also changes in this manner, thus the reaction resistance index Rr represents the deterioration state of the main pump cell 21. Therefore, the deterioration state of the main pump cell 21 can be measured by calculating the reaction resistance index Rr.

The first frequency may be predetermined, for example, by an experiment as a frequency in which the reaction resistance of the inner pump electrode 22 and the outer pump electrode 23 is likely to occur. Similarly, the second frequency may be predetermined, for example, by an experiment as a frequency in which the reaction resistance of the inner pump electrode 22 and the outer pump electrode 23 is unlikely to occur as compared to the first measurement. In other words, the first frequency and the second frequency may be predetermined so that the difference between the first impedance R1 and the second impedance R2 becomes relatively large. An appropriate frequency may vary depending on the individual difference of the sensor element 101 and the size of the electrode (here, the inner pump electrode 22 and the outer pump electrode 23) for which reaction resistance is measured. For example, the first frequency may be lower than or equal to 500 Hz. The second frequency may be higher than or equal to 1000 Hz. Also, the lower the frequency, the longer the period of applied voltage, and the time required for impedance measurement is increased, thus the first frequency is preferably higher than or equal to 1 Hz. The second frequency may be lower than or equal to 1 MHz, or may be lower than or equal to 100 KHz.

The above-mentioned impedance measurer 47 measures the first impedance R1 and the second impedance R2 by performing the first measurement and the second measurement. In this embodiment, the first frequency is set to 10 Hz, and the second frequency is set to 10000 Hz. The controller 91 calculates the reaction resistance index Rr based on the values of R1,R2 measured by the impedance measurer 47. In this embodiment, as described above, the controller 91 calculates the difference between R1 and R2 as the reaction resistance index Rr. In the example of FIG. 4, when the main pump cell 21 is not deteriorated, value A which is the difference between an impedance |Z| (=R1) corresponding to 10 Hz and an impedance |Z| (=R2) corresponding to 10000 Hz is calculated as the value of the reaction resistance index Rr. When the main pump cell 21 deteriorates and the relationship shown by the solid line of FIG. 4 changes to the relationship shown by the dashed-dotted line, the value of the second impedance R2 hardly changes, and the first impedance R1 increases only by value B, thus the value (A+B) is calculated as the value of the reaction resistance index Rr.

In normal times, specifically when the NOx concentration is measured, the controller 91 performs the above-described main pump control process; however, while the impedance measurer 47 performs the first measurement and the second measurement, it is preferable that the controller 91 control the variable power supply 24 so that the voltage Vp0 is reduced to a level lower than in the normal time main pump control process. For example, in the case where the main pump cell 21 is not deteriorated in FIG. 4, when the voltage Vp0, which is a DC voltage, in addition to the pulse voltage is applied, the relationship between the frequency of pulse voltage and the impedance |Z| changes from the curve shown by a solid line to the curve shown by a chain double-dashed line in FIG. 4. Specifically, the value of impedance |Z|, particularly in a region with a low frequency increases due to the voltage Vp0. Consequently, the value of the second impedance R2 hardly changes, and the first impedance R1 increases only by value C, thus the value (A+C) is calculated as the value of the reaction resistance index Rr. In other words, not the reaction resistance, but a component due to the voltage Vp0 is included in the reaction resistance index Rr. Thus, correlation between the reaction resistance index Rr and the reaction resistance decreases, and the accuracy of measurement of the deterioration state of the main pump cell 21 may reduce. The voltage Vp0 is reduced to a level lower than in normal times, thus it is possible to reduce the effect of such pump current Vp0 on the first measurement and the second measurement. For example, the controller 91 may control the variable power supply 24 so that the voltage Vp0 does not exceed a predetermined upper limit value during execution of the first measurement and the second measurement. More specifically, when the set value of the voltage Vp0 determined by the feedback control in the main pump control process exceeds the upper limit value, the controller 91 may change the set value to the upper limit value. The upper limit value may be, for example, 100 mV, or may be a predetermined value in a range higher than 0 mV and lower than or equal to 100 mV. Alternatively, the upper limit value may be 0 mV. In other words, during execution of the first measurement and the second measurement, the controller 91 may stop the main pump control process so that the voltage Vp0 is not applied to the main pump cell 21.

Next, an example of a process of performing measurement of NOx concentration and impedance measurement by the controller 91 of the gas sensor 100 will be described.

Figure 5:
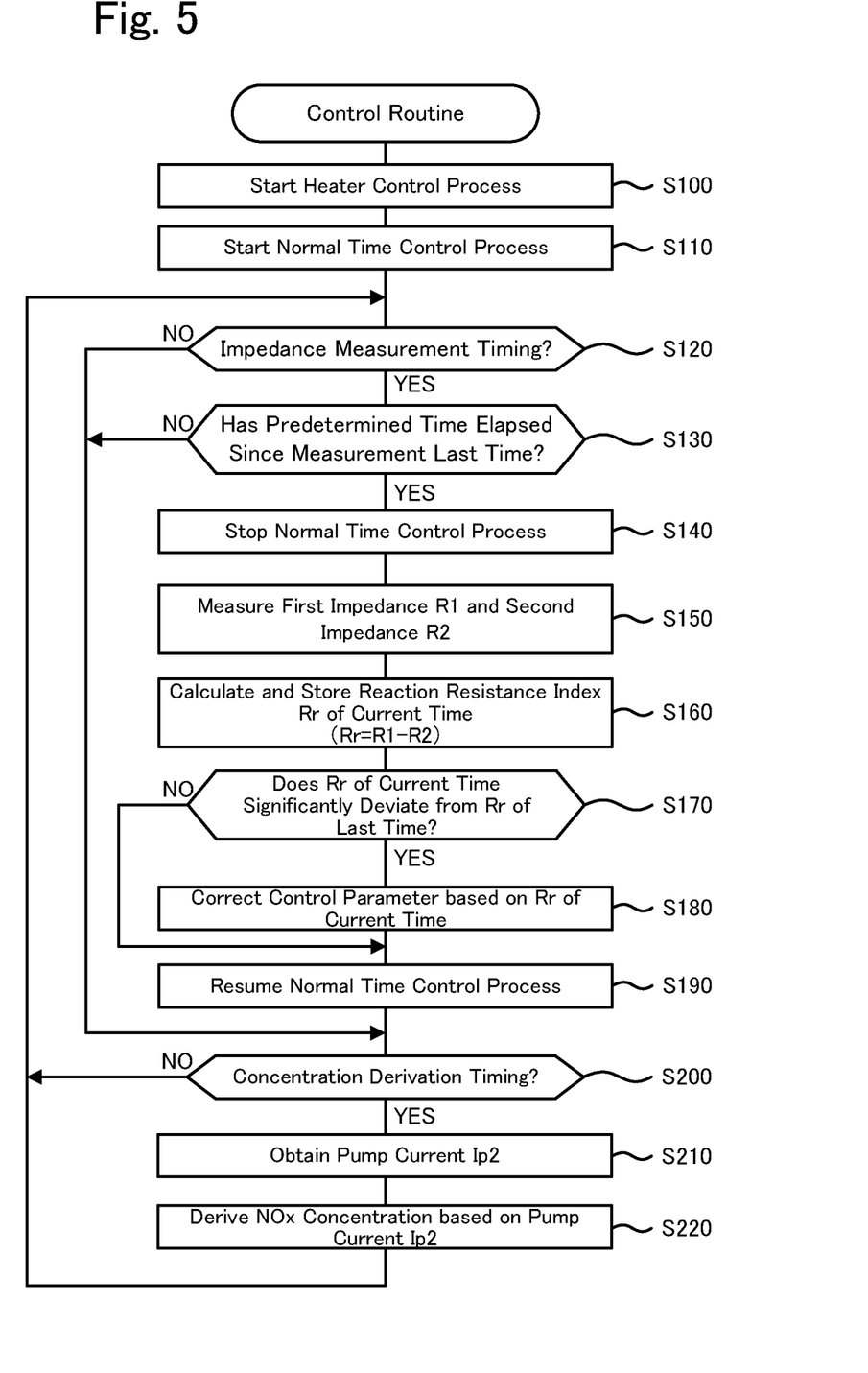
FIG. 5 is a flowchart showing an example of a control routine.

FIG. 5 is a flowchart showing an example of a control routine executed by the controller 91. The controller 91 stores this routine, for example, in the storage section 94. For example, when a start command is input from an unillustrated engine ECU, the controller 91 starts the control routine.

When a control routine is started, the CPU 92 of the controller 91 first outputs a control signal to the heater power supply 76, and starts a heater control process of controlling the heater 72 so that the temperature of the heater 72 reaches a target temperature (for example, 850° C.) (step S100). Here, the temperature of the heater 72 can be represented in terms of a linear function of the resistance value of the heater 72. Thus, in the heater control process of this embodiment, the CPU 92 calculates the resistance value of the heater 72 as a value (value convertible to a temperature) which can be regarded as the temperature of the heater 72, and performs feedback control on the heater power supply 76 so that the calculated resistance value reaches a target resistance value (a resistance value corresponding to a target temperature). The CPU 92 obtains, for example, the voltage of the heater 72 and the current flowing through the heater 72, and can calculate the resistance value of the heater 72 based on the obtained voltage and current. The CPU 92 may calculate the resistance value of the heater 72, for example, by a three-terminal method or a four-terminal method. The CPU 92 outputs a control signal to the heater power supply 76 to perform feedback control on the electric power supplied by the heater power supply 76 so that the calculated resistance value of the heater 72 reaches a target resistance value. The heater power supply 76 adjusts the electric power to be supplied to the heater 72, for example, by changing the value of a voltage applied to the heater 72 when energizing the heater 72.

Subsequently, the CPU 92 starts a normal time control process which is a control process in normal times, specifically when the NOx concentration is measured (step S110). Specifically, the CPU 92 starts the main pump control process, the auxiliary pump control process, and the measurement pump control process described above.

Next, the CPU 92 determines whether the current timing is an impedance measurement timing appropriate for the first measurement and the second measurement performed by the impedance measurer 47 (step S120). Here, the reaction resistance of the inner pump electrode 22 and the outer pump electrode 23 changes depending on the atmosphere also, particularly the oxygen concentration around the inner pump electrode 22 and the outer pump electrode 23. For this reason, at the time of measurement of the deterioration state of the main pump cell 21, it is preferable that the oxygen concentration around the inner pump electrode 22 and the outer pump electrode 23 be constant every time. In this embodiment, the impedance measurement timing is set to when a measurement-object gas around the inner pump electrode 22 and the outer pump electrode 23 can be regarded as an air atmosphere. More specifically, the impedance measurement timing is set to when a measurement-object gas around the inner pump electrode 22 and the outer pump electrode 23 can be regarded as an exhaust gas of an internal combustion engine at the time of fuel cut. For example, the CPU 92 determines e.g., every predetermined time whether the control apparatus 90 has obtained, from an unillustrated engine ECU, fuel cut execution information indicating that fuel cut of an internal combustion engine is performed, and when the fuel cut execution information is obtained, determines that fuel cut is performed. When a predetermined delay time has elapsed since the fuel cut execution information is obtained, the CPU 92 determines that a measurement-object gas around the inner pump electrode 22 and the outer pump electrode 23 is an exhaust gas of an internal combustion engine at the time of fuel cut, and the current timing is an impedance measurement timing. The delay time is predetermined based on the time required for the measurement-object gas to flow from the internal combustion engine to the sensor element 101, and is stored in the storage section 94.

In step S120, when the current timing is determined to be an impedance measurement timing, the CPU 92 determines whether a predetermined time or longer has elapsed since the execution of impedance measurement of the last time (step S130). The predetermined time is a value provided to prevent frequent impedance measurement, and is predetermined by an experiment as a time interval necessary for measurement of the deterioration state of the main pump cell 21. In this embodiment, the predetermined time is set to one hour. Note that this determination may be omitted. When the result of determination in step S130 is affirmative, the CPU 92 temporarily stops the normal time control process which has started in step S110 and continues to be performed (step S140). Thus, the main pump control process, the auxiliary pump control process, and the measurement pump control process are stopped, and a state is achieved in which the voltages Vp0, Vp1, Vp2 are not applied to the main pump cell 21, the auxiliary pump cell 50, and the measurement pump cell 41.

Subsequently, the CPU 92 causes the impedance measurer 47 to perform the above-described first measurement and second measurement to measure the first impedance R1 and the second impedance R2 (step S150). Any of the first measurement and the second measurement may be performed first. The CPU 92 then calculates the reaction resistance index Rr (=R1−R2), and stores the calculated value as the reaction resistance index Rr of the current time in the storage section 94 (step S160). Thus, the deterioration state of the main pump cell 21 is measured.

Next, the CPU 92 reads the reaction resistance index Rr of the last time from the storage section 94, and determines whether the reaction resistance index Rr of the current time significantly deviates from the reaction resistance index Rr of the last time, in other words, whether the degree of progress of deterioration of the main pump cell 21 from the last time is not negligible (step S170). For example, when the reaction resistance index Rr of the current time deviates from the reaction resistance index Rr of the last time by 10% or more (the value has increased), the CPU 92 determines that significant deviation exists between both. Note that when the reaction resistance index Rr of the last time is not stored in the storage section 94 in such a situation where step S170 is performed for the first time, an initial value Rr0 of the reaction resistance index Rr stored in the storage section 94 may be regarded as the reaction resistance index Rr of the last time. The initial value Rr0 is the value of a reaction resistance index Rr measured in a state where the main pump cell 21 is not deteriorated, for example, when the sensor element 101 is manufactured. For example, when the gas sensor 100 is manufactured, the initial value Rr0 is measured in advance by a worker, and stored in the storage section 94. The initial value Rr0 is measured in the same conditions (such as the frequency, the temperature of the heater 72, the oxygen concentration around the inner pump electrode 22 and the outer pump electrode 23) as those for the first measurement and the second measurement in step S150.

When the result of determination in step S170 is affirmative, the CPU 92 corrects the control parameter for the main pump control process based on the reaction resistance index Rr of the current time (step S180). When the main pump cell 21 deteriorates and the reaction resistance changes, the oxygen pumping capability of the main pump cell 21 also changes. More specifically, when the reaction resistance of the main pump cell 21 increases, the pumping capability of the main pump cell 21 is reduced. Thus, the CPU 92 corrects the control parameter for the main pump control process based on the reaction resistance index Rr so as to supplement the reduced pumping capability. For example, the CPU 92 first normalizes the reaction resistance index Rr of the current time relative to the initial value Rr0, thereby calculating the deterioration rate of the main pump cell 21. For example, the deterioration rate is set to the value obtained by dividing Rr of the current time by Rr0. The deterioration rate has a greater value for further progress of deterioration of the main pump cell 21. The CPU 92 then corrects the control parameter for the feedback control (for example, the above-described feedback control of the voltage Vp0 performed so that the voltage V0 reaches the target value V0*) of the main pump control process based on the deterioration rate. For example, the CPU 92 may use, as a corrected control parameter, the value obtained by multiplying the control parameter for the feedback control in the main pump control process by the deterioration rate. The control parameter is, for example, the P term constant (proportional gain), the I term constant (integral gain), the D term constant (derivative gain) of PID control, or the target value V0*, and the CPU 92 corrects one or more of these control parameters.

When negative determination is made in step S170 or after step S180, the CPU 92 resumes the normal time control process (step S190). When correction is made in step S180, the main pump control process of the normal time control process is performed using the one or more corrected control parameters.

After step S190 is performed, when negative determination is made in step S120, or when negative determination is made in step S130, the CPU 92 determines whether the current timing is a concentration derivation timing for deriving the NOx concentration (step S200). The CPU 92 determines that the current timing is a concentration derivation timing, for example, every predetermined time or when a concentration derivation command is input from the engine ECU. When the current timing is determined to be a concentration derivation timing in step S200, the CPU 92 obtains (measures) the pump current Ip2 during execution of the normal time control process (step S210), and derives the NOx concentration in the measurement-object gas based on the obtained pump current Ip2 and the correspondence relationship stored in the storage section 94 (step S220). The CPU 92 outputs the value of the derived NOx concentration to the engine ECU, or stores the value in the storage section 94.

After step S220 or the current timing is not a concentration derivation timing in step S200, the CPU 92 performs the processes in and after S120. As described above, the CPU 92 executes the control routine, thereby measuring the NOx concentration repeatedly while making measurement of the deterioration state of the main pump cell 21 and correction based on the result of the measurement.

The correspondence relationship between the components in this embodiment and the components in the present invention will now be clarified. A layered body in which six layers of the first substrate layer 1, the second substrate layer 2, the third substrate layer 3, the first solid electrolyte layer 4, the spacer layer 5, and the second solid electrolyte layer 6 according to this embodiment are stacked in this order corresponds to an element body according to the present invention, the inner pump electrode 22 corresponds to an inner electrode, the outer pump electrode 23 corresponds to an outer electrode, the main pump cell 21 corresponds to a pump cell, the impedance measurer 47 corresponds to an impedance measurer, and the controller 91 corresponds to a calculation unit. In addition, the main pump control process performed as part of the normal time control process corresponds to a normal time pump control process. The voltage Vp0 corresponds to a control voltage. The pump current Ip2 corresponds to a measurement pump current. The controller 91 corresponds to a controller and a specific gas concentration detector.

In the gas sensor 100 according to this embodiment described above in detail, the controller 91 calculates the reaction resistance index Rr correlated with the reaction resistance of the main pump cell 21 based on the first impedance R1 and the second impedance R2 measured by the impedance measurer 47. When the main pump cell 21 deteriorates and the reaction resistance changes, the reaction resistance index Rr also changes, thus the reaction resistance index Rr represents the deterioration state of the main pump cell 21. Therefore, the deterioration state of the main pump cell 21 can be measured in the gas sensor 100.

The controller 91 performs the normal time main pump control process (an example of the normal time pump control process) to control the main pump cell 21 by applying the voltage Vp0 to the main pump cell 21. The controller 91 then reduces the voltage Vp0 to a level lower than in the normal time main pump control process during execution of the first measurement and the second measurement performed by the impedance measurer 47. This reduces the effect of the voltage Vp0 applied to the main pump cell 21 on the first measurement and the second measurement, thus the deterioration state of the main pump cell 21 can be measured with higher accuracy.

Furthermore, because the first frequency of the voltage applied in the first measurement is set to lower than or equal to 500 Hz, the reaction resistance of the main pump cell 21 is more likely to occur in the first impedance R1. In addition, because the second frequency of the voltage applied in the second measurement is set to higher than or equal to 1000 Hz, the reaction resistance of the main pump cell 21 is more unlikely to occur in the second impedance R2. Therefore, by using such first frequency and second frequency, the deterioration state of the main pump cell 21 can be measured with higher accuracy.

Furthermore, the controller 91 normalizes the calculated reaction resistance index Rr relative to the initial value Rr0 of the reaction resistance index Rr, thereby calculating the deterioration rate of the main pump cell 21. Thus, the degree of progress of deterioration of the main pump cell 21 from the initial state can be measured as the deterioration rate. As compared to the reaction resistance index Rr itself, the deterioration rate calculated in this manner is likely to be utilized, for example, when the correction as in step S180 is made.

The controller 91 corrects the control parameter for the feedback control of the main pump cell 21 based on the reaction resistance index Rr. Consequently, the controller 91 corrects the control parameter according to the reaction resistance of the main pump cell 21, thus can control the main pump cell 21 appropriately according to the deterioration state of the main pump cell 21.

The present invention is not limited whatsoever to the embodiment described above, and various embodiments may be implemented so long as they belong within the technical scope of the present invention.

In the embodiment described above, the voltage applied in the first measurement and the second measurement is a pulse voltage with a rectangular wave; however, without being limited to this, the voltage applied may be a periodic voltage. For example, a pulse voltage with a triangular wave or a sine wave may be applied.

In the embodiment described above, the CPU 92 stops the normal time control process in step S140 of the control routine of FIG. 5. However, without being limited to this, as described above, the voltage Vp0 during execution of the first measurement and the second measurement is set to a value greater than 0 mV, but may be reduced to a level lower than in normal times. In this case, the auxiliary pump control process and the measurement pump control process do not need to be stopped. In addition, step S140 and step S190 may be omitted, and the normal time control process may be performed even during execution of the first measurement and the second measurement. In this case, as compared to the above-described embodiment, the correlation between the reaction resistance index Rr and the reaction resistance decreases, however, the reaction resistance index Rr can be measured. Furthermore, in this case, the NOx concentration can be derived even during execution of the first measurement and the second measurement.

In the embodiment described above, the controller 91 corrects the control parameter for the main pump control process based on the calculated reaction resistance index Rr; however, the controller 91 does not need to correct the control parameter. In this case, the controller 91 may diagnose the deterioration state of the main pump cell 21 based on the reaction resistance index Rr. For example, the controller 91 may calculate the above-mentioned deterioration rate from the reaction resistance index Rr, and when the deterioration rate exceeds a predetermined threshold, the controller 91 may output a signal to inform the engine ECU of abnormality of the sensor element 101.

In the embodiment described above, the target for which reaction resistance is measured is the main pump cell 21; however, without being limited to this, the target for which reaction resistance is measured may be a pump cell having the inner electrode and the outer electrode. For example, the target for which reaction resistance is measured may be the auxiliary pump cell 50 having the auxiliary pump electrode 51 and the outer pump electrode 23, or may be the measurement pump cell 41 having the measurement electrode 44 and the outer pump electrode 23. Even when these are targets for measurement, as in the above-described embodiment, the control parameter may be corrected based on the reaction resistance index Rr. For example, when the target for which reaction resistance is measured is the measurement pump cell 41, the controller 91 may correct the control parameter for the feedback control of the measurement pump control process based on the reaction resistance index Rr. The control parameter for correction target may be, for example, one or more of the P term constant, the I term constant, the D term constant, or the target value V2* of PID control. In addition, two or more of the main pump cell 21, the auxiliary pump cell 50, and the measurement pump cell 41 may be targets for which reaction resistance is measured. In this case, a reaction resistance may be measured for each of the pump cells. Also, correction of the control parameter may be made for each of the pump cells. As in the measurement of the reaction resistance of the main pump cell 21, when the reaction resistance of the auxiliary pump cell 50 is measured, during execution of the first measurement and the second measurement, it is preferable that the voltage Vp1 be reduced to a level lower than in the normal time auxiliary pump control process, and the auxiliary pump control process may be stopped. When the reaction resistance of the measurement pump cell 41 is measured, during execution of the first measurement and the second measurement, it is preferable that the voltage Vp2 be reduced to a level lower than in the normal time measurement pump control process, and the measurement pump control process may be stopped.

When the measurement pump cell 41 is a target for which reaction resistance is measured, the controller 91 may correct, based on the reaction resistance index Rr, the specific gas concentration derived based on the pump current Ip2, instead of correcting the control parameter for the measurement pump cell 41. When the measurement pump cell 41 deteriorates and the reaction resistance changes, the oxygen pumping capability of the measurement pump cell 41 changes. Thus, even when the NOx concentration in the measurement-object gas is the same before and after the change in the reaction resistance, the pump current Ip2 may change. In other words, the correspondence relationship between the pump current Ip2 and the NOx concentration may change. In contrast, when the NOx concentration is corrected according to the reaction resistance of the measurement pump cell 41, it is possible to prevent reduction in the accuracy of detection of the NOx concentration due to deterioration of the measurement pump cell 41. For example, when the measurement pump cell 41 deteriorates and the reaction resistance increases, the oxygen pumping capability of the measurement pump cell 41 is reduced, thus even with the same NOx concentration, the value of the pump current Ip2 decreases as compared to before the deterioration of the measurement pump cell 41. Thus, reduction in the accuracy of detection of the NOx concentration can be prevented by correcting the NOx concentration derived based on the value of measured pump current Ip2 to a greater value for a larger reaction resistance index Rr. For example, when the expression of a quadratic function (NOx concentration=$A \times (Ip2)^2 + B \times Ip2 + C$, A to C are coefficients) is stored as a correspondence relationship between the pump current Ip2 and the NOx concentration, the coefficient A may be corrected to a greater value for a larger reaction resistance index Rr.

In the embodiment described above, the controller 91 may correct the target temperature of the heater control process based on the reaction resistance index Rr of the main pump cell 21. The higher the temperature of the heater 72, the reaction resistance of the main pump cell 21 tends to decrease. Thus, change in the reaction resistance due to deterioration of the main pump cell 21 can be supplemented by correcting the target temperature of the heater 72 based on the reaction resistance index Rr. The target temperature of the heater 72 may be corrected based on the reaction resistance index Rr so that an increase in the reaction resistance of the main pump cell 21 due to deterioration is reduced (canceled) to achieve a reaction resistance close to the reaction resistance in the state (initial state) before the deterioration. More specifically, the target temperature of the heater 72 may be corrected to a higher value for a larger reaction resistance index Rr. The controller 91 may use, as a corrected target temperature, the value obtained by multiplying the target temperature by a deterioration rate calculated from the reaction resistance index Rr. In the heater control process according to the embodiment described above, the resistance value of the heater 72 is used as a value convertible to a temperature, thus the controller 91 corrects the target temperature by correcting a target resistance value.

The adverse effects due to deterioration of the main pump cell 21 can be reduced by correcting the target temperature of the heater control process based on the reaction resistance index Rr in this manner. Note that the target temperature may be corrected based on the reaction resistance index Rr of one or more of the main pump cell 21, the auxiliary pump cell 50, and the measurement pump cell 41. For example, the target temperature may be corrected based on the maximum value or the average value of the respective deterioration rates of the main pump cell 21, the auxiliary pump cell 50, and the measurement pump cell 41. In this case, the controller 91 corresponds to a heater controller.

In the above-described embodiment, the outer pump electrode 23 serves as an outer main pump electrode, an outer auxiliary pump electrode, and an outer measurement electrode, the outer main pump electrode being disposed in a portion which is part of the main pump cell 21 and exposed to a measurement-object gas outside the sensor element 101, the outer auxiliary pump electrode disposed in a portion which is part of the auxiliary pump cell 50 and exposed to a measurement-object gas outside the sensor element 101, the outer measurement electrode disposed in a portion which is part of the measurement pump cell 41 and exposed to a measurement-object gas outside the sensor element 101; however, the configuration is not limited thereto. In addition to the outer pump electrode 23, one or more of the outer main pump electrode, the outer auxiliary pump electrode, and the outer measurement electrode may be provided outside the sensor element 101.

In the above-described embodiment, the outer pump electrode 23 is exposed to the outside of the sensor element 101; however, the configuration is not limited thereto, and the outer pump electrode 23 may be provided outside the element bodies (layers 1 to 6) so as to be in contact with a measurement-object gas. For example, the sensor element 101 may include a porous protective layer that covers the element bodies (layers 1 to 6), and the outer pump electrode 23 may also be covered with the porous protective layer.

Figure 6:
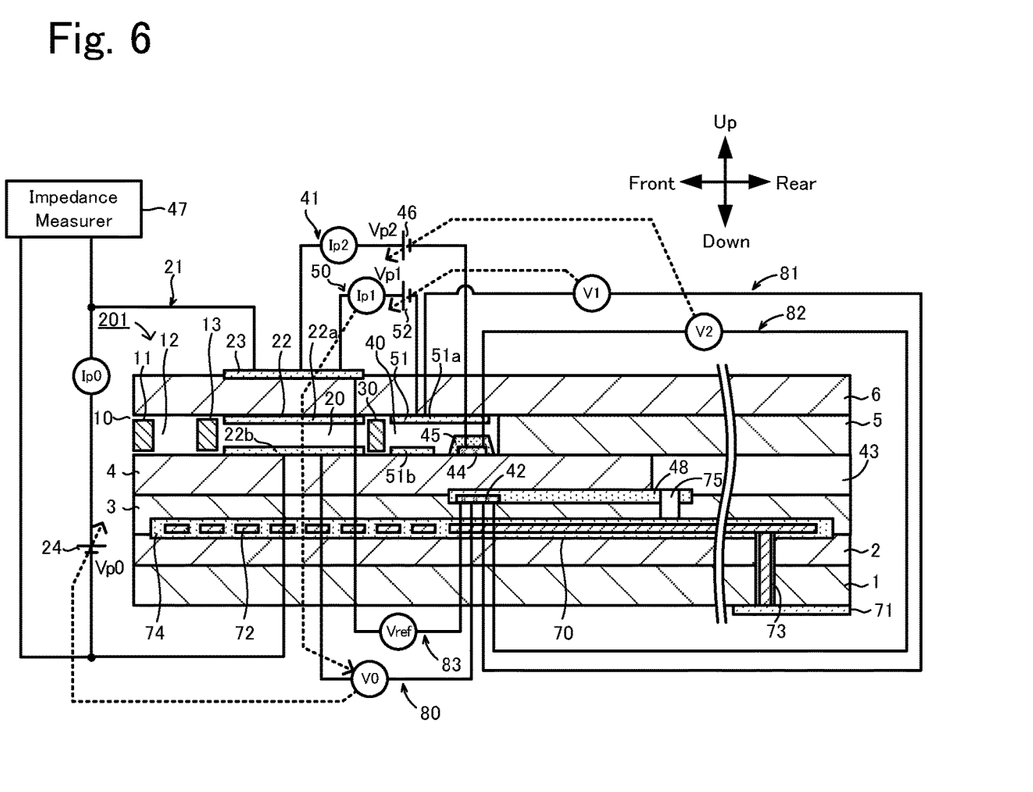
FIG. 6 is a schematic cross-sectional view of a sensor element 201 of a modification.

In the above-described embodiment, the sensor element 101 of the gas sensor 100 includes the first internal cavity 20, the second internal cavity 40, and the third internal cavity 61; however, the configuration is not limited thereto. For example, as in the case of a sensor element 201 of FIG. 6, the third internal cavity 61 may be omitted. In the sensor element 201 of a modification shown in FIG. 6, the gas inlet port 10, the first diffusion controlled portion 11, the buffer space 12, the second diffusion controlled portion 13, the first internal cavity 20, the third diffusion controlled portion 30, and the second internal cavity 40 are formed adjacent to each other in this order between the under surface of the second solid electrolyte layer 6 and the top surface of the first solid electrolyte layer 4 so as to communicate with each other. The measurement electrode 44 is disposed on the top surface of the first solid electrolyte layer 4 in the second internal cavity 40. The measurement electrode 44 is coated with a fourth diffusion controlled portion 45. The fourth diffusion controlled portion 45 is a film made up of a ceramic porous material, such as alumina ($Al_2O_3$). The fourth diffusion controlled portion 45, as well as the fourth diffusion controlled portion 60 of the above-described embodiment, plays a role in limiting the amount of NOx flowing into the measurement electrode 44. The fourth diffusion controlled portion 45 also functions as a protection film for the measurement electrode 44. The ceiling electrode portion 51a of the auxiliary pump electrode 51 is formed up to just above the measurement electrode 44. With the thus configured sensor element 201 as well, it is possible to detect a NOx concentration in accordance with, for example, a pump current Ip2 as in the case of the above-described embodiment. In this case, the surroundings of the measurement electrode 44 function as a measurement chamber.

In the above-described embodiment, the element body of the sensor element 101 is a layered body including a plurality of solid electrolyte layers (layers 1 to 6); however, the configuration is not limited thereto. The element body of the sensor element 101 may include at least one oxygen-ion-conductive solid electrolyte layer and include a measurement-object gas flow portion inside. For example, the layers 1 to 5 other than the second solid electrolyte layer 6 in FIG. 1 may be a structural layer made of a material other than a solid electrolyte (for example, a layer made of alumina). In this case, the electrodes of the sensor element 101 just need to be disposed on the second solid electrolyte layer 6. For example, the measurement electrode 44 of FIG. 1 just needs to be disposed on the under surface of the second solid electrolyte layer 6. The reference gas inlet space 43 may be provided in the spacer layer 5 instead of the first solid electrolyte layer 4, the atmosphere inlet layer 48 may be provided between the second solid electrolyte layer 6 and the spacer layer 5 instead of being provided between the first solid electrolyte layer 4 and the third substrate layer 3, and the reference electrode 42 may be provided on the rear side with respect to the third internal cavity 61 on the under surface of the second solid electrolyte layer 6.

In the above-described embodiment, in the main pump control process, the control apparatus 90 sets (executes feedback control on) the target value V0* of the voltage V0 based on the pump current Ip1 so that the pump current Ip1 reaches a target value Ip1* and executes feedback control on the voltage Vp0 so that the voltage V0 reaches a target value V0*; however, another control may be employed. For example, in the main pump control process, the control apparatus 90 may execute feedback control on the voltage Vp0 in accordance with the pump current Ip1 so that the pump current Ip1 reaches a target value Ip1*. In other words, the control apparatus 90 may directly control the voltage Vp0 (by extension, control the pump current Ip0) in accordance with the pump current Ip1 by omitting acquisition of the voltage V0 from the main pump control oxygen partial pressure detection sensor cell 80 and setting of the target value V0*.

In the above-described embodiment, the gas sensor 100 detects a NOx concentration as a specific gas concentration; however, the configuration is not limited thereto. Another oxide concentration may be used as a specific gas concentration. In the case where the specific gas is an oxide, oxygen is produced when the specific gas itself is reduced in the third internal cavity 61 as in the case of the above-described embodiment, so the CPU 92 is able to detect a specific gas concentration based on a detected value corresponding to the oxygen. Alternatively, the specific gas may be a non-oxide, such as ammonia. When the specific gas is a non-oxide, the specific gas is converted to an oxide, for example, in the first internal cavity 20 (for example, ammonia is oxidized and converted to NO), and oxygen is produced when the oxide after conversion is reduced in the third internal cavity 61, so the CPU 92 is able to detect a specific gas concentration by acquiring a detected value corresponding to the oxygen. In this manner, in whichever case the specific gas is an oxide or a non-oxide, the gas sensor 100 is able to detect a specific gas concentration based on the oxygen produced from a specific gas in the third internal cavity 61.

What is claimed is:

1. A gas sensor that detects a specific gas concentration in a measurement-object gas, the gas sensor comprising:
an element body which includes an oxygen-ion-conductive solid electrolyte layer, and is internally provided with a measurement-object gas flow section that introduces the measurement-object gas and flows the measurement-object gas;
a pump cell having an inner electrode disposed in the measurement-object gas flow section, and an outer electrode disposed outside the element body to come into contact with the measurement-object gas, the pump cell being configured to adjust an oxygen concentration in a vicinity of the inner electrode;
an impedance measurer that performs a first measurement to measure a first impedance by applying a voltage having a first frequency to the pump cell and a second measurement to measure a second impedance by applying a voltage having a second frequency higher than the first frequency to the pump cell;
a calculation unit that calculates a reaction resistance index correlated with a reaction resistance of the pump cell based on the first impedance and the second impedance;
a reference electrode disposed inside the element body to come into contact with a reference gas which serves as a reference for detecting the specific gas concentration in the measurement-object gas; and
a controller that adjusts the oxygen concentration in the vicinity of the inner electrode by performing feedback control on a control voltage applied across the outer electrode and the inner electrode so that a voltage across the reference electrode and the inner electrode reaches a target value,
wherein the controller corrects a control parameter for the feedback control based on the reaction resistance index.

2. The gas sensor according to claim 1, further comprising a controller that executes a normal time pump control process of controlling the pump cell by applying a control voltage to the pump cell,
wherein during execution of the first measurement and the second measurement, the controller reduces the control voltage to a level lower than in the normal time pump control process.

3. The gas sensor according to claim 1,
wherein the first frequency is lower than or equal to 500 Hz, and
the second frequency is higher than or equal to 1000 Hz.

4. The gas sensor according to claim 1,
wherein the calculation unit calculates a deterioration rate of the pump cell by normalizing the calculated reaction resistance index relative to an initial value of the reaction resistance index.

5. The gas sensor according to claim 1,
wherein the inner electrode is a measurement electrode provided in a measurement chamber of the measurement-object gas flow section,
the pump cell is a measurement pump cell that pumps out oxygen originating from the specific gas from a vicinity of the measurement electrode, and the gas sensor includes:
a reference electrode disposed inside the element body to come into contact with a reference gas which serves as a reference for detecting the specific gas concentration in the measurement-object gas;
a controller that performs a measurement pump control process of performing feedback control on a control voltage applied across the outer electrode and the measurement electrode so that a voltage across the reference electrode and the measurement electrode reaches a target value; and
a specific gas concentration detector that detects the specific gas concentration in the measurement-object gas based on a measurement pump current which flows through the measurement pump cell by the measurement pump control process,
wherein the specific gas concentration detector corrects the specific gas concentration based on the reaction resistance index.

6. The gas sensor according to claim 1, further comprising:
a heater that heats the element body; and
a heater controller that performs a heater control process of causing the heater to generate heat by energizing the heater so that a temperature of the heater reaches a target temperature,
wherein the heater controller corrects the target temperature based on the reaction resistance index.

7. A gas sensor that detects a specific gas concentration in a measurement-object gas, the gas sensor comprising:
an element body which includes an oxygen-ion-conductive solid electrolyte layer, and is internally provided with a measurement-object gas flow section that introduces the measurement-object gas and flows the measurement-object gas;
a pump cell having an inner electrode disposed in the measurement-object gas flow section, and an outer electrode disposed outside the element body to come into contact with the measurement-object gas, the pump cell being configured to adjust an oxygen concentration in a vicinity of the inner electrode;
an impedance measurer that performs a first measurement to measure a first impedance by applying a voltage having a first frequency to the pump cell and and a second measurement to measure a second impedance by applying a voltage having a second frequency higher than the first frequency to the pump cell;
a calculation unit that calculates a reaction resistance index correlated with a reaction resistance of the pump cell based on the first impedance and the second impedance;
a heater that heats the element body; and
a heater controller that performs a heater control process of causing the heater to generate heat by energizing the heater so that a temperature of the heater reaches a target temperature,
wherein the heater controller corrects the target temperature based on the reaction resistance index.

* * * * *